(12) United States Patent
Ringström

(10) Patent No.: US 7,823,503 B2
(45) Date of Patent: *Nov. 2, 2010

(54) APPARATUS FOR THE EVAPORATIVE COOLING OF A LIQUID PRODUCT

(75) Inventor: Roland Ringström, Veberöd (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 413 days.

This patent is subject to a terminal disclaimer.

(21) Appl. No.: 10/591,693

(22) PCT Filed: Mar. 3, 2005

(86) PCT No.: PCT/SE2005/000324

§ 371 (c)(1),
(2), (4) Date: Jul. 13, 2007

(87) PCT Pub. No.: WO2005/084451

PCT Pub. Date: Sep. 15, 2005

(65) Prior Publication Data

US 2008/0000362 A1 Jan. 3, 2008

(30) Foreign Application Priority Data

Mar. 3, 2004 (SE) .................................. 0400520

(51) Int. Cl.
*A23C 1/00* (2006.01)
*A23C 3/04* (2006.01)

(52) U.S. Cl. .......................................... 99/454; 99/455

(58) Field of Classification Search ........... 99/327–333, 99/337–340, 483, 372–379, 403–418, 467–479, 99/485–489, 516–536, 454, 455; 426/522–523
See application file for complete search history.

(56) References Cited

U.S. PATENT DOCUMENTS

| 5,019,218 | A | * | 5/1991 | Hamer et al. ................. 203/87 |
| 5,417,084 | A | * | 5/1995 | Sakuma et al. ............... 62/532 |
| 5,443,857 | A | * | 8/1995 | Arph et al. .................. 426/522 |

(Continued)

FOREIGN PATENT DOCUMENTS

EP  0617897 A1  10/1994

(Continued)

*Primary Examiner*—Tu B Hoang
*Assistant Examiner*—Lindsey C Teaters
(74) *Attorney, Agent, or Firm*—Buchanan Ingersoll & Rooney PC

(57) ABSTRACT

The disclosure relates to an apparatus for the evaporative cooling of a liquid product. The apparatus comprises a vacuum chamber (1) which is divided into a first, centrally positioned space (6) and a second space (7) which concentrically surrounds the first space (6). Both of the spaces (6, 7) are open towards the upper end wall (2) of the vacuum chamber (1). The first space (6) has an outlet (25) for condensed steam. The second space (7) has an inlet (11) for steamed product, as well as an outlet (12) for the product. The apparatus also includes a circulation circuit for coolant liquid. The first space (6) is extended downwards so that it extends at least as far below the bottom end wall (4) of the vacuum chamber (1) as the extent of the space (6) inside the vacuum chamber (1).

8 Claims, 2 Drawing Sheets

U.S. PATENT DOCUMENTS

Figure 1:
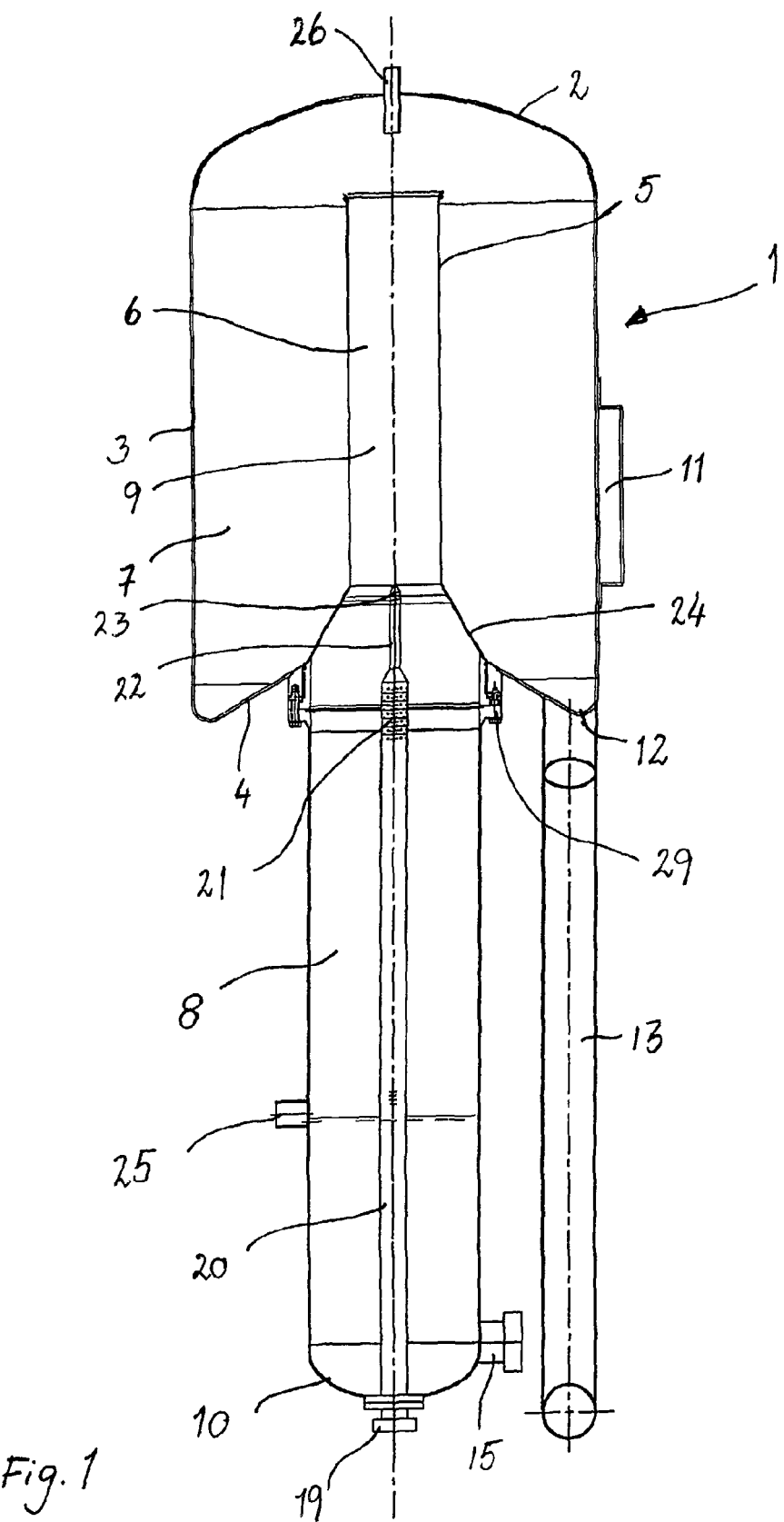

| | | |
|---|---|---|
| 5,544,571 A | 8/1996 | Nahra et al. |
| 5,727,452 A | 3/1998 | Jensen |
| 6,513,422 B1 | 2/2003 | Palm |
| 7,322,283 B2 * | 1/2008 | Palm et al. .................... 99/516 |

FOREIGN PATENT DOCUMENTS

| | | |
|---|---|---|
| SE | 514560 | 3/2001 |
| WO | 2004/009203 A1 | 1/2004 |

* cited by examiner

APPARATUS FOR THE EVAPORATIVE COOLING OF A LIQUID PRODUCT

FIELD OF THE INVENTION

The present invention relates to an apparatus for the evaporative cooling of a liquid product, comprising a vacuum chamber divided into a first centrally positioned space and a second space which concentrically surrounds the first space and where both of the spaces are open towards the upper end wall of the vacuum chamber, the first space having an outlet for condensed steam and the second space having an inlet for steamed product, as well as an outlet for the product, the apparatus further including a circulation circuit for coolant liquid.

BACKGROUND

Heat treatment of liquid food products, such as milk, is a commonly occurring industrial process today. By heating the product, extended shelf-life will be obtained by the extermination of those microorganisms which are to be found in the product. In the sterilisation of the food product, it is heated to temperatures exceeding 100° C. In order rapidly to heat to such elevated temperatures, steam is employed. The heating may take place either directly or indirectly. In indirect heating, use is made of different types of heat exchangers. In direct heating, steam is added directly to the product.

There are two types of direct heating of a liquid product, injection and infusion. In injection, steam is injected into the product in a closed system. Infusion implies that the product is finely divided and caused to pass through a space filled with steam. In both cases, the supplied steam rapidly and efficiently heats up the product to the desired temperature and the product is then kept at this temperature during a given predetermined interval of time. The supplied steam must thereafter be removed from the product in order to avoid diluting it. This normally takes place by evaporative cooling, so-called flash-cooling, in a vacuum chamber. During the process, the steam is released and condensed at the same time as the product is cooled down to the temperature it had before the heat treatment.

The evaporative cooling usually takes place in that the steamed product is fed, under pressure, into a vacuum chamber. When the product enters into the vacuum chamber, the liquid boils, the steam is released and rises upwards in the chamber while the product accumulates in the lower region of the chamber. Thus cooled, the product may be tapped off from the lower region of the chamber. The steam which leaves the product together with incondensable gases is to be condensed in order for it to be able to be run off to an outlet. The condensation may be put into effect either in that the steam and the gases are led into a further vacuum chamber where the steam is cooled by being showered with cold water, or that the steam is condensed in some form of water-cooled plate condenser or tube condenser. The plate or tube condenser may be integrated in the first vacuum chamber or alternatively be placed outside it.

The majority of the apparatuses in existence today for condensing the steam are relatively expensive to manufacture since, in the first case, an extra vacuum chamber is required, or alternatively some form of condenser is needed. For the conventional method of condensing the steam, a considerable quantity of coolant water is moreover consumed, and this water should be of good quality so as to avoid limestone furring and corrosion on plates or tubes in the condenser.

Swedish Patent Specification SE 514 560 discloses an apparatus for evaporative cooling which only utilises one vacuum chamber. The vacuum chamber is divided into two concentrically placed spaces which are open upwards towards the upper end wall of the chamber. The steamed product enters into the one space, and in the second space the released steam is showered with coolant water from a closed circulation circuit. Nor does this apparatus require any expensive and complicated condensers. However, one drawback inherent in this apparatus is that there is a risk that the coolant water which is employed for condensing the steam may splash over to the second space and thereby dilute the product, or even worse run the risk of infecting the sterile food product. By showering with coolant liquid from above in the one space, there is also created a cold surface against the product space which may result in the steam in the product being condensed too early and that a part of the steam thereby accompanies the product out from the plant.

SUMMARY

One object of the present invention is to design the apparatus intimated by way of introduction so that the coolant water which is showered over the released steam does not run the risk of finding its way into the product.

A further object of the present invention is to design the apparatus so that there is no cold surface against the product which results in the steam in the product being condensed too early and thereby accompanying the product.

Yet a further object of the present invention is that the closed coolant water circuit may be washed together with the remaining processing equipment which is sterilised together with other equipment, thus affording increased safety and reliability for an apparatus which handles sensitive food products.

These and other objects have been attained according to the present invention in that the apparatus of the type described by way of introduction has been given the characterising feature that the first space is extended downwards so that it extends at least as far below the bottom of the vacuum chamber as the extent of the space inside the vacuum chamber.

Preferred embodiments of the present invention have further been given the characterising features as set forth in the appended subclaims.

BRIEF DESCRIPTION OF THE ACCOMPANYING DRAWINGS

Figure 2:
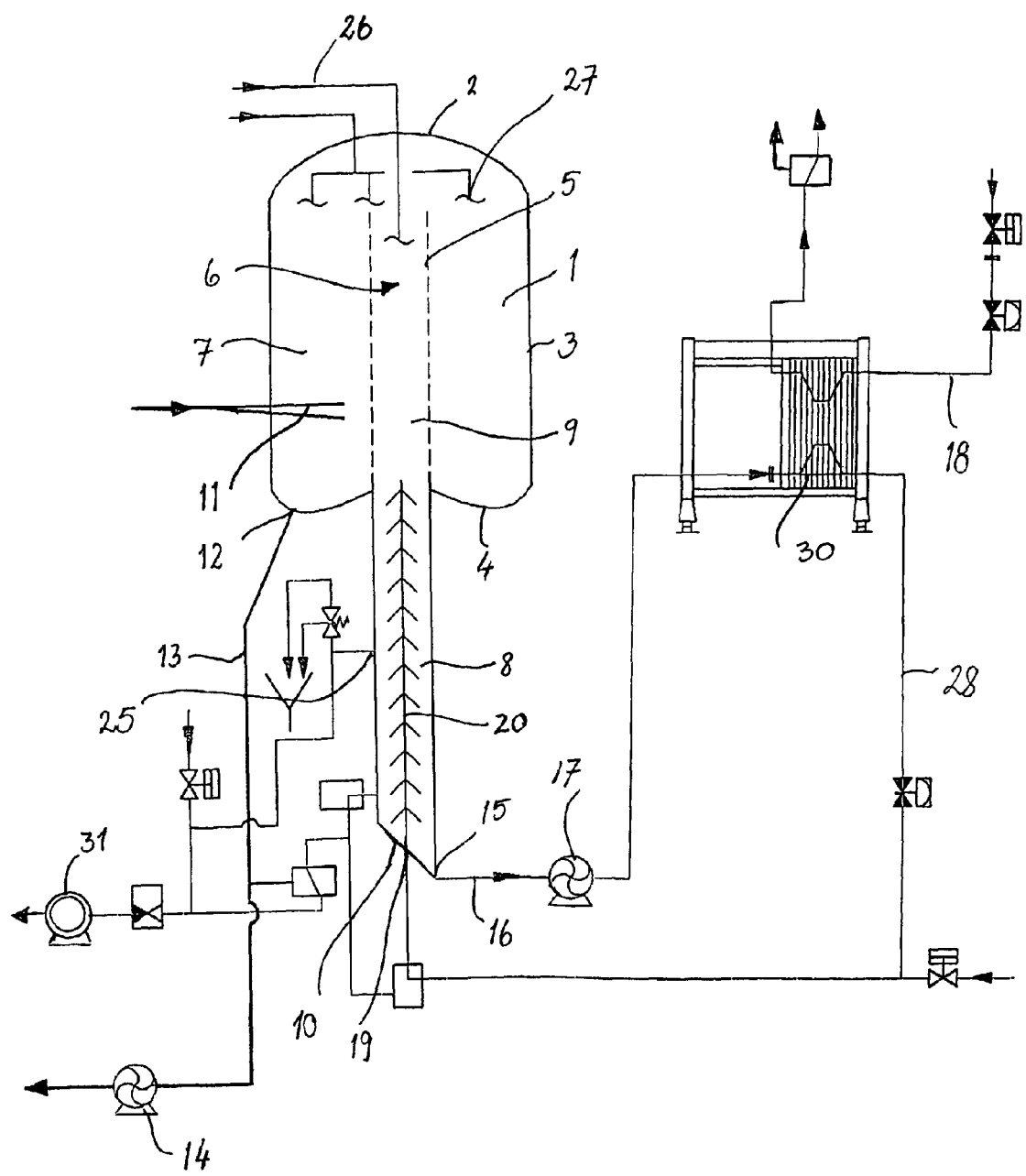

One preferred embodiment of the present invention will now be described in greater detail hereinbelow, with reference to the accompanying Drawings. In the accompanying Drawings:

FIG. 1 is a side elevation, partly in section, of the vacuum chamber in the apparatus; and FIG. 2 is a flow diagram for the apparatus.

DETAILED DESCRIPTION

An apparatus for the evaporative cooling of a liquid product comprises a vacuum chamber 1 which is shown in detail in FIG. 1. The vacuum chamber 1 has an upper end wall 2, a side wall 3 and a bottom wall 4. Inside the vacuum chamber 1, there is disposed an additional circular wall 5 which divides the vacuum chamber 1 into two concentrically disposed spaces, a first space 6 and a second space 7. Both of the spaces 6, 7 are open towards the upper end wall 2 of the vacuum chamber 1. The lower definition of the second space 7 consists of the bottom wall 4 of the vacuum chamber 1.

The first space 6 which is positioned centrally in the vacuum chamber 1 is extended downwards so that the space 6 continues below the bottom wall 4 of the vacuum chamber 1, so that the space 6 consists of two parts 8, 9. That part 8 of the space 6 which is located below the bottom wall 4 is of a longer or alternatively equally long extent as that part 9 which is located above the bottom wall 4 and inside the vacuum chamber 1. The lower part 8 has a bottom portion 10 which is rounded-off or otherwise suitably designed for a vacuum chamber.

As a result of the above-described design of the vacuum chamber with both of its spaces 6, 7, no manhole is required on the vacuum chamber 1. By disconnecting the lower part 8 of the first space 6 from the upper part 9 at a connection 29, it is then possible to draw out the upper part 9 from the vacuum chamber 1 and by such means gain access to the vacuum chamber 1. In that the manhole becomes superfluous, the vacuum chamber 1 may be manufactured considerably more economically.

In the second space 7 in the vacuum chamber 1, there is provided an inlet 11 for the steamed, heated product. The inlet 11 is tangentially disposed in the side wall 2 of the vacuum chamber 1 and is arranged as a vertical gap. In the second space 7, there is also provided an outlet 12 for the cooled product. The bottom wall 4 of the vacuum chamber 1 is designed so that liquid, i.e. product or cleaning liquid, cannot be left standing in the lower region of the second space 7. The outlet 12 is connected to a conduit 13 which, via a centrifugal pump 14, pumps the product further for continued treatment.

The first space 6 has, in its bottom portion 10, an outlet 15 for the coolant liquid, preferably water, which is to condense the steam from the product. The outlet 15 is connected to a conduit 16 which, via a centrifugal pump 17, pumps the coolant water to a cooler 30. The cooler 30 may, for example, be a plate heat exchanger. The cooler 30 is also connected to a cold water conduit 18.

From the cooler 30, the coolant water passes further into an almost closed circuit via a conduit 28, back to a coolant water inlet 19 in the bottom portion 10 of the first space 6. The coolant water conduit continues through most of the lower part 8 of the first space 6. That portion 20 which passes through the lower part 8 of the first space 6 has, in its upper end, a number of apertures 21 which are directed downwards. Through these apertures 21, coolant water is showered down onto the steam which is located in the lower part 8 of the first space 6. The number of apertures 21 depends upon the capacity for which the apparatus is calculated.

The coolant water conduit 20 passing through the part 8 may also be extended somewhat upwards so that there will be provided a short pipe length 22 of slight diameter which, in its upper region, is provided with a number of holes 23. These holes 23 may, if necessary, be employed for cooling the wall surface 24 between the first 6 and the second 7 space. For products which show a ready tendency to froth, the cooling of the wall surface 24 may contribute in counteracting the frothing. A large frothing may entail that product froth may accompany the steam into the first space 6, with product losses as a result.

In the lower part 8 of the first space 6, there is also provided an outlet 25 for the condensed steam and the incondensable gases departing from the product. The outlet 25 is designed as a spillway overflow. The conduit from this outlet 25 normally passes via a vacuum pump 31 to an outlet. It is this vacuum pump 31 which besides creates vacuum in the chamber 1.

The vacuum chamber 1 is also provided with one or more connections 26 for cleaning, with spray nozzles 27 placed inside the upper region of the vacuum chamber 1. By interconnecting the closed coolant water circuit by valve arrangement with the remaining processing equipment, the coolant water circuit may be washed together with the remaining equipment and be connected to the standard CIP equipment (Cleaning In Place) with which conventional processing plants are equipped. As a result of these valve arrangements, the closed coolant water circuit may also be sterilised together with remaining processing equipment, which affords an additional level of safety if coolant water were to leak into the product.

The product, which is normally at a temperature of 70 to 120° C., is heat treated before entering the apparatus. The product is heated by being directly supplied with steam in an injector or an infuser (not shown). The product is heated in the injector or infuser normally to a temperature of from 100 to 150° C. and is then kept at this temperature in a holding cell (not shown) for a given predetermined interval of time. This interval of time is dependant upon the treatment temperature.

After the holding cell, the product which is mixed with steam enters under pressure into the vacuum chamber 1 of the apparatus through the tangential inlet 11. As a result of the tangential design of the inlet 11, the product will follow the side wall 3 in the chamber 1 as a result of so-called cyclone effect. When the product enters into the vacuum chamber 1 under pressure, the liquid will boil on the sudden pressure drop, in which event steam and incondensable gases are released from the product. The heavier product falls downwards in the second space 7, while the lighter steam and the incondensable gases rise.

The product which has been freed of steam is now at a temperature corresponding to the temperature it had before the heat treatment, i.e. between 70 and 120° C. The product is accumulated in the lower portion of the second space 7 in the vacuum chamber 1 and departs therefrom through the outlet 12. Via the conduit 13 and the centrifugal pump 14, the product is transported further to additional cooling, or alternatively to other treatment.

The steam and the incondensable gases that have risen upwards in the vacuum chamber 1 are drawn down in the upper portion 9 of the first space 6 which functions as an evacuation pipe. In the lower part 8 of the first space 6, the steam and gases will be showered with coolant water from the coolant water conduit 20 and the apertures 21. The coolant water may be at a temperature of between 10 and 40° C. The higher the temperature of the coolant water, the greater will be the quantity of coolant water which is consumed for condensing the steam. In that the coolant water is showered out over the steam at a level which lies below the upper part 8 of the first space 6, there is no risk that coolant water, which may be unsterile, leaks into the product.

The condensed steam, the coolant water and the incondensable gases accumulate in the lower region of the lower part 8 of the first space 6. The spillway overflow 25 is disposed here such that the addition of condensed steam and gases leaves the apparatus through this spillway overflow 25, whereafter the condensed steam and the gases are normally led direct to an outlet.

The coolant water which accumulates under the spillway overflow 25 in the lower region of the lower part 8 of the first space 6 is included in the almost closed circulation circuit for coolant water which is included in the apparatus. Via the outlet 15 and the conduit 16, coolant water is pumped from the vacuum chamber 1 by means of the circulation pump 17 to the cooler 30. The cooler 30 may, for example, consist of a plate heat exchanger. In the cooler 30, the water is cooled to a temperature of between 10 and 40° C. with the aid of cold water which enters into the cooler 30 through the conduit 18.

After the cooler 30, the coolant water passes back to the vacuum chamber 1 via the conduit 28, through the inlet 19 and the conduit 20 where the coolant water is once again utilised for showering the released steam from the product. By employing an almost closed coolant water circuit, the consumption of coolant liquid is reduced. By a suitable valve arrangement, the coolant water circuit is washable and is capable of being sterilised together with the rest of the process equipment.

As will have been apparent from the foregoing description, the present invention realises an apparatus for the evaporative cooling of a liquid food product which is cheaper than most apparatuses occurring on the market. The apparatus ensures that the coolant water cannot reach the product at any stage. In that the coolant water circuit may be washed and sterilised with the rest of the equipment, an even more hygienic apparatus will be obtained. As a result of the design of the apparatus, there will be no cold surface against that space where the product is kept, with the result that the steam in the product is not condensed too early and thereby accompanies the product.

What is claimed is:

1. An apparatus for evaporative cooling of a liquid product, comprising: a vacuum chamber including a to wall and a bottom wall and divided into a first chamber centrally positioned with respect to the longitudinal axis of the vacuum chamber and a second chamber which concentrically surrounds the first chamber and in which both the first and second chambers are open towards the top wall of the vacuum chamber, and the first chamber has an outlet for condensed steam and the second chamber has an inlet for steamed product and an outlet for the product; a circulation circuit for coolant liquid, wherein the first chamber has an upper part located inside the vacuum chamber and a lower part located beneath the bottom wall of the vacuum chamber, and the lower part extends downwards below the bottom wall of the vacuum chamber so that the length of the lower part below the bottom wall is at least the same as the length of the upper part inside the vacuum chamber; and a coolant conduit positioned inside the lower part of the first chamber located below the bottom wall for delivering coolant to cool the condensed steam.

2. The apparatus as claimed in claim 1, wherein the upper part of the first chamber located inside the vacuum chamber and the lower part of the first chamber located beneath the bottom wall of the vacuum chamber are configured to be detachable from each other.

3. The apparatus as claimed in claim 1, wherein the inlet for product is tangentially disposed in a side wall of the vacuum chamber and is formed as a vertical gap.

4. The apparatus as claimed in claim 1, wherein the circulation circuit for coolant water discharges via the conduit in an upper region of a lower part of the first chamber.

5. The apparatus as claimed in claim 1, wherein the outlet for condensed steam is a spillway overflow.

6. The apparatus as claimed in claim 4, wherein the conduit is provided in its upper region with a number of downwardly directed apertures.

7. The apparatus as claimed in claim 4, wherein the circulation circuit for coolant liquid includes an outlet, conduits, a centrifugal pump, as well as a cooler.

8. The apparatus as claimed in claim 1, wherein ingress and egress of the coolant is at a lower portion of the lower part of the first chamber.

* * * * *

UNITED STATES PATENT AND TRADEMARK OFFICE
CERTIFICATE OF CORRECTION

| | | |
|---|---|---|
| PATENT NO. | : 7,823,503 B2 | Page 1 of 1 |
| APPLICATION NO. | : 10/591693 | |
| DATED | : November 2, 2010 | |
| INVENTOR(S) | : Roland Ringström | |

It is certified that error appears in the above-identified patent and that said Letters Patent is hereby corrected as shown below:

Claim 1, column 5, line 27, change "to" to --top--.

Signed and Sealed this
Eighth Day of February, 2011

David J. Kappos
*Director of the United States Patent and Trademark Office*